United States Patent [19]

Jones et al.

[11] Patent Number: 4,615,114

[45] Date of Patent: Oct. 7, 1986

[54] METHOD OF MANUFACTURING MOLDED BUSWORK FOR POWER DISTRIBUTION SYSTEMS

[75] Inventors: Howard T. Jones; Thomas M. Golner, both of Waukesha, Wis.

[73] Assignee: ASEA Electric, Incorporated, Waukesha, Wis.

[21] Appl. No.: 588,553

[22] Filed: Mar. 12, 1984

[51] Int. Cl.⁴ ............... H02G 1/14; H02G 15/08; H01R 4/20

[52] U.S. Cl. .................. 29/858; 29/867; 29/871; 174/71 R; 174/84 C; 264/272.12; 264/272.15

[58] Field of Search ........... 174/71 R, 71 B, 71 C, 174/72 R, 72 B, 75 R, 76, 84 R, 84 C, 84 S, 110 S; 156/49; 29/858, 867, 871; 264/272.11, 272.12, 272.15, 279.1; 339/218 R, 218 M; 361/341

[56] References Cited

U.S. PATENT DOCUMENTS

| | | | |
|---|---|---|---|
| 2,459,004 | 1/1949 | Rogoff | 174/71 R |
| 2,727,120 | 12/1955 | Boggs | 174/75 R |
| 2,933,550 | 4/1960 | Cole et al. | 174/76 |
| 3,142,716 | 7/1964 | Gardener | 264/272.15 |
| 3,496,284 | 2/1970 | Astrove | 174/72 R |
| 3,590,138 | 6/1971 | Sugimoto et al. | 174/72 R |
| 4,360,849 | 11/1982 | Harris et al. | 361/39 |

FOREIGN PATENT DOCUMENTS

| | | | |
|---|---|---|---|
| 46-24516 | 7/1971 | Japan | 174/71 R |
| 47-341 | 1/1972 | Japan | 174/71 R |
| 54-5590 | 1/1979 | Japan | 174/71 R |

*Primary Examiner*—Laramie E. Askin
*Attorney, Agent, or Firm*—Ronald E. Barry

[57] ABSTRACT

A molded buswork and method of manufacturing the buswork, including a conductive T-shaped member having openings at the ends, insulated cables having the insulation at the ends of the cables stripped away to expose the ends of the conductors, an individual exposed conductor being crimped in each open end of the conductive member, the conductive member being supported in a cavity mold by the cables, the cavity mold being filled with a thermal-setting silicone rubber, the silicone rubber curing in the mold to encapsulate and bond to the conductive member, the exposed ends of the conductors, and the insulation on each cable.

6 Claims, 8 Drawing Figures

METHOD OF MANUFACTURING MOLDED BUSWORK FOR POWER DISTRIBUTION SYSTEMS

BACKGROUND OF THE INVENTION

Bushing junctions used in Power Distribution Systems as described in U.S. Pat. No. 4,360,849 issued on Nov. 23, 1982, are used to connect the transition cubicle to the feeder cubicles. Each bushing junction includes three bushings interconnected by a common bus bar. Connections to the bushings are made through flexible cable assemblies having rubber elbows at the ends.

SUMMARY OF THE INVENTION

In the present invention, a buswork having molded insulation bonded to the bus bars and the connectors has been substituted for the bushing junction and cable assemblies described in U.S. Pat. No. 4,360,849. The buswork described herein is substantially reduced in size, requires less time to manufacture and can be easily assembled at the construction site. The insulating material is basically a silicone rubber which is bonded to the electrical connector and cable conductors during the molding process to reduce both the voltage stress and the size of the finished buswork. Silicone rubber can be easily prepared for molding either at the point of manufacture or in the field. Silicone rubber also has a low viscosity and can be easily fed by gravity into a mold cavity. The molded connectors and cables have good hydrolytic stability and will not degrade in the presence of corona. The high temperature characteristics of silicone rubber is known to be better than the temperature characteristics of insulation presently used for the cable. Connections to the cables have been substantially simplified by providing an interlocking mechanism between the conductors and the T-connectors.

IN THE DRAWINGS

DESCRIPTION OF THE INVENTION

Figure 1:
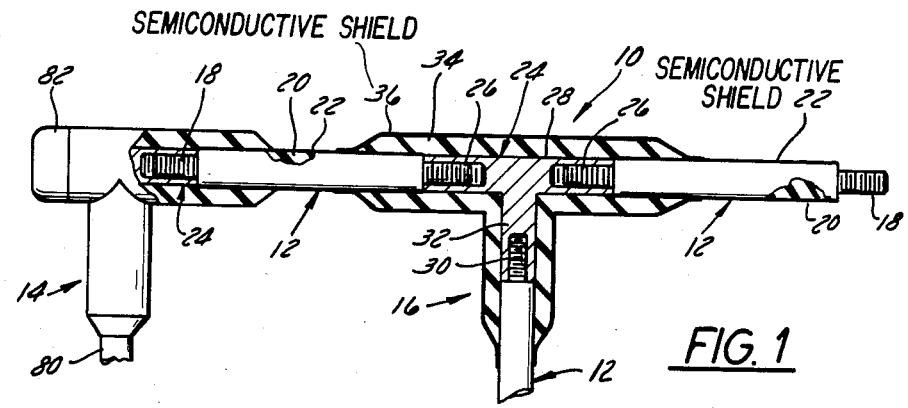
FIG. 1 is a view partly in section showing a molded insulation buswork.

The molded insulation buswork 10, according to the present invention, utilizes molded insulation bus bars 12 and molded insulation T-connectors 14, 16 to form a completely molded bus for a power distribution system as shown in U.S. Pat. No. 4,360,849. Each of the bus bars 12 includes a solid copper bar 18 having a molded silicone rubber insulation 20 and a semi-conductive shield 22. Each of the connectors 14, 16 includes a conductive member 24 having interlocking means 26 located at the ends of a cross member 28 and an interlocking means 30 in the center or tap member 32. The interlocking means can be in the form of a thread bore as shown in the drawings or in the form of bands or a twist type connection as disclosed in U.S. Pat. No. 4,360,849. The conductive member 24 is encapsulated in a molded silicone rubber insulation 34 and a semi-conductive shield 36. With this arrangement, the entire buswork will be completely encapsulated in silicone rubber and shielded. The overall size of the buswork will be reduced approximately to half the size of the original buswork.

Figure 2:
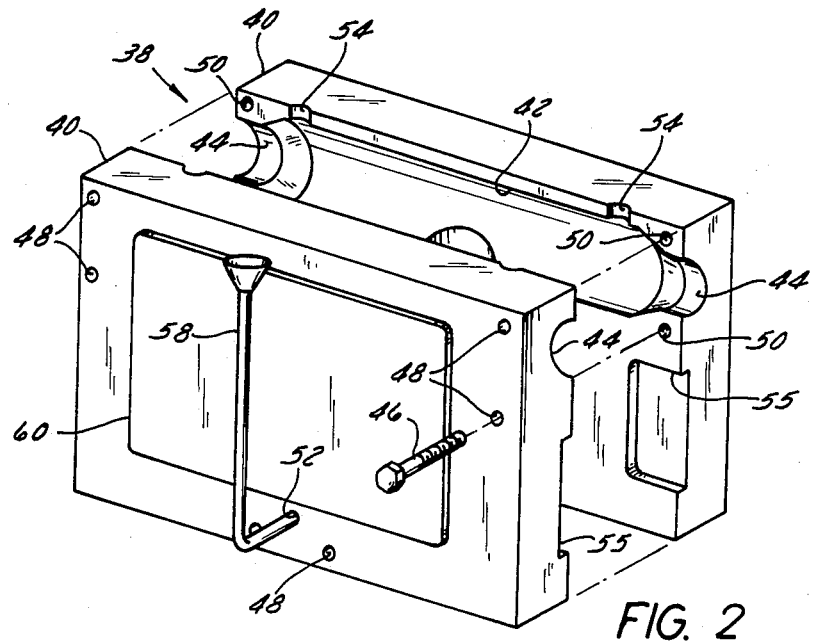
FIG. 2 is a perspective view of the split mold in which the insulated T-connector is molded.

The insulation 34 for the T-connector 16 is vulcanized onto the conductive member 24 in a split mold 38, as shown in FIG. 2. The mold 38 includes two sections 40, each having a T-shaped cavity 42 having a radius greater than the radius of the insulation 20 on the bus bars 12. The cavity 42 includes a reduced diameter section 44 at each of the open ends of the T-shaped cavity 42. The diameters of the sections 44 are equal to or less than the diameter of the insulation 20 of the bus bars 12. The two sections are closed to form the mold cavity by placing hex head bolts 46 in openings 48 in one section of the mold and screwing the bolts into threaded openings 50 in the other section of the mold. The silicone rubber which forms the insulation 34 is admitted into the cavity 42 by means of an opening 52 provided in the lower portion of the mold. The cavity is vented by means of vent openings 54 located at the top of the molds. Recesses 55 are provided at each end of the mold to aid in prying the mold apart.

Figure 3:
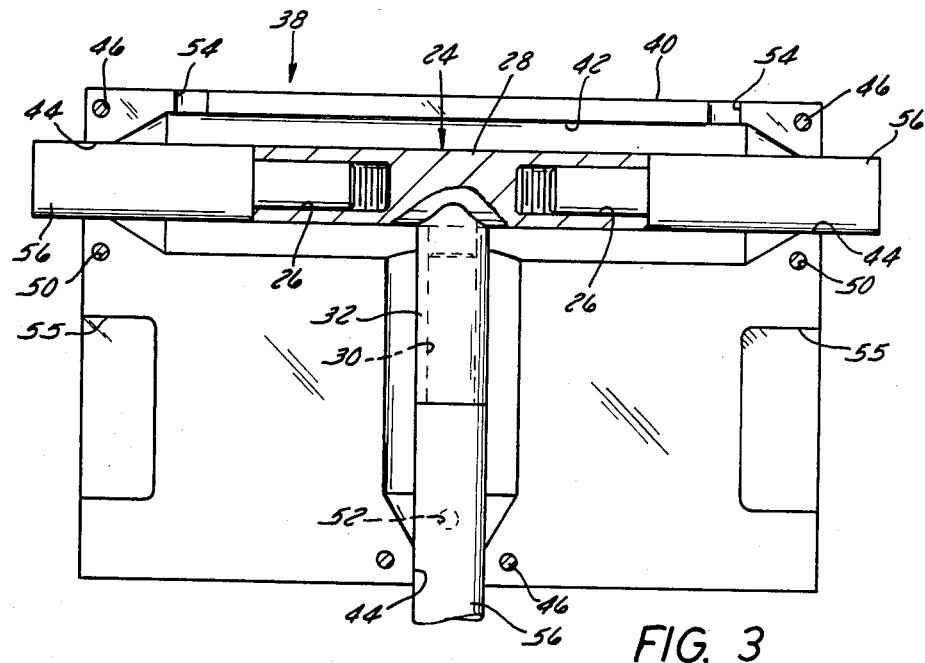
FIG. 3 is a view of the conductive member for the T-connector shown supported by plugs in the mold cavity.

The molding operation for the T-connector 16 as seen in FIG. 3 includes the steps of placing plugs 56 in openings 26 and 30 in the conductive member 24. The plugs 56 have diameters equal to or slightly larger than the diameter of the insulation 20 on the bus bars 12. The conductive member 24 is placed in the cavity 42 of the mold with the plugs 56 positioned in the reduced diameter sections 44. The surface of the conductive member 24 is coated with an adhesive primer to aid in bonding the insulation to the member 24. The mold sections are closed by tightening the bolts 46 in the threaded openings 50. Closing of the mold will seal the sections 44 against the plugs 56. The cavity 42 is filled with the silicone rubber by gravity feed or a peristaltic pump (not shown) through a tube 58 connected to the opening 52. The liquid silicone rubber rises in the cavity 42 with little or no turbulence, thus eliminating any cavitation of the liquid which could produce bubbles in the liquid insulation. The insulation is poured continuously through the tube 58 until it can be observed in the vent openings 54. The silicone rubber is allowed to cure in the mold and finally the mold is pried open to remove the insulated T-connector 16. If the T-connectors 14, 16 are connected to the circuit breakers by flexible cables, the cable can be substituted for the plug 56 in the opening 30 in member 32.

The insulation for the bus bar 12 and connectors 14, 16 is formed from a two-component room temperature-vulcanizing liquid silicone rubber such as RTV 627A and 627B sold by the Silicone Products Department of the General Electric Company, Waterford, N.Y. A primer also sold by G.E. such as Adhesive Primer SS4155 may be used to bond the silicone rubber to the conductive member 24 and bar 18 as described hereinafter.

The silicone rubber insulation will normally cure at room temperature in approximately 24 hours in the mold 38. Curing can be expedited by heating the mold sections. This can be accomplished by providing heating pads 60 on the outside of each of the mold sections 40. The heating pads are plugged into a 120 volt source to increase the temperature of the aluminum mold and accelerate the curing time of the silicone rubber. The silicone rubber will completely cure within about one hour using heating pads.

Another advantage of heating the mold is the ability to cure the liquid silicone rubber from the outside in. That is, the outside surface of the liquid silicone rubber in the mold will cure first creating a shell or surface. The liquid will be confined within the outer cured surface creating pressure against the surface of the conductive member 24. Any bubbles that may form on the surface of the conductive member 24 will be compressed against the surfaces of the members 28 and 32 thereby reducing or eliminating possible voltage stress areas around the conductive member 24.

Figure 4:
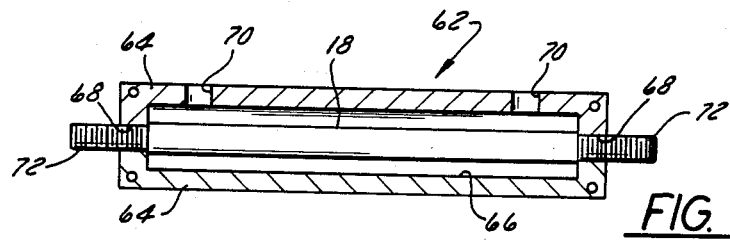
FIG. 4 is a view of a solid bus conductor positioned in the cavity of a mold.

The bus bars 12 as noted above are also provided with a silicone rubber insulation 20 which is molded to the outer surface of solid copper bars or members 18. Referring to FIG. 4, it should be noted that the silicone rubber insulation 20 is molded to the bars 18 in a cavity mold 62 by the same process as used to mold the connector 14. The mold 62 is formed of two sections 64 each having a center cavity 66, and a pair of reduced diameter openings 68 at each end. The cavity 66 is vented through openings 70. The two sections 64 are mounted on the bar 18 and the cavity 66 gravity filled with a liquid silicone rubber through an inlet (not shown) until the liquid can be seen in vent openings 70. The mold lengths can be varied or standardized to the distances between the cubicles of the Power Distribution System. The ends 72 of the bars 18 are provided with an interlocking means at each end for engagement with the interlocking means 26 and 30 in the T-connector 14.

The buswork 10 is assembled by inserting the ends 72 of the bus bars 12 into the interlocking means 26 provided in the cross-member 28. The bus bars should be inserted far enough for the end of the insulation 20 to engage the end of the cross member 28. The tap connections are made as the T-connectors 14 are mounted on the cubicles.

As the buswork is being assembled, the semi-conductive shield 36 for the T-connectors 14, 16 and the bus bars 18 can be provided by means of heat shrinkable semi-conductive tubes, semi-conductive paint, semi-conductive tape or any combination thereof. The heat shrinkable tube can be telescoped over the bus bar 18 and the adjacent half of the T-connector 16. Heat is applied to the conductive tube to shrink the tube into tight engagement with the outer surface of the insulation 20 on bus bar 18 and the insulation 34 on the conductive member 24.

Figure 5:
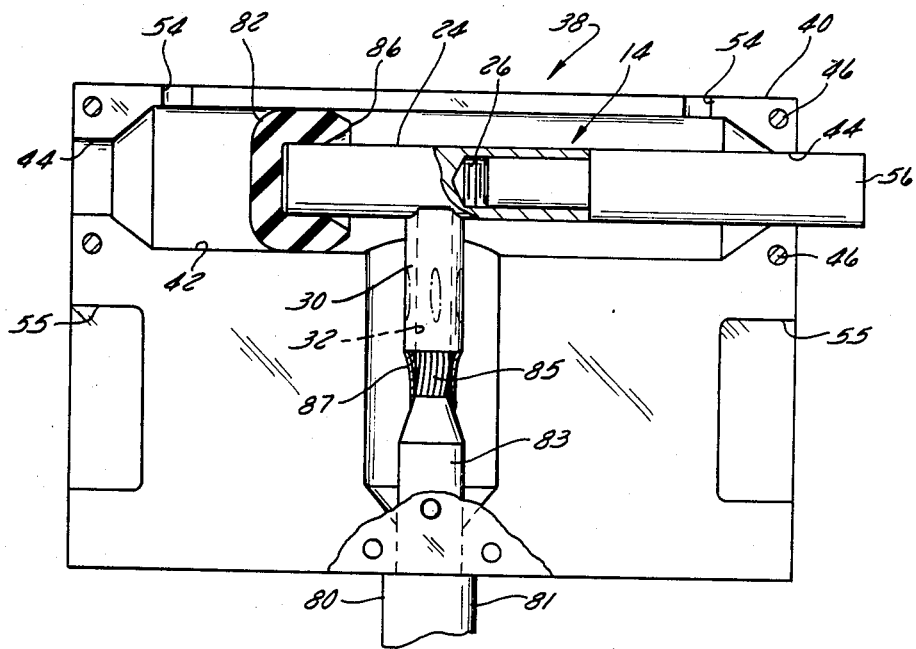
FIG. 5 is a view similar to FIG. 3 showing a conductive member with a cap on one end to provide a two cable connector.

Referring to FIG. 5, the connector 14 shown at the end of the buswork 10 is used to connect the end bus 12 to the cable 80 for the transition cubicle in the PDS. In order to mold the insulation for the T-connector 14 in the mold 38, an insulating cap 82 is mounted on the open or blind end of the conductive member 24. One plug 56 is inserted in opening 26 and the cable 80 is inserted in the opening 32 in the member 30. The cap 82 is premolded of the same insulating material, silicone rubber, as the insulation 34 and is designed to support the open end of the conductive member 24 in the mold in order to close the open end of cavity 42. In this regard, the diameter of the cap 82 is substantially equal to the diameter of the cavity 42 in the mold 38. The open end of the cap 82 is tapered to form a ridge 86 to thereby reduce voltage stress at the junction of the insulation 34 and the end of the cap 82. The cable 80 is a flexible cable having a portion of the shield 81 removed to expose the cable insulation 83. The end of the insulation 83 is also removed to expose the conductor 85 which is crimped into opening 32. A conductive tape 87 is used to cover the exposed conductor between the insulation and member 30. In all other respects, the molding process is essentially the same as described above.

Figure 6:
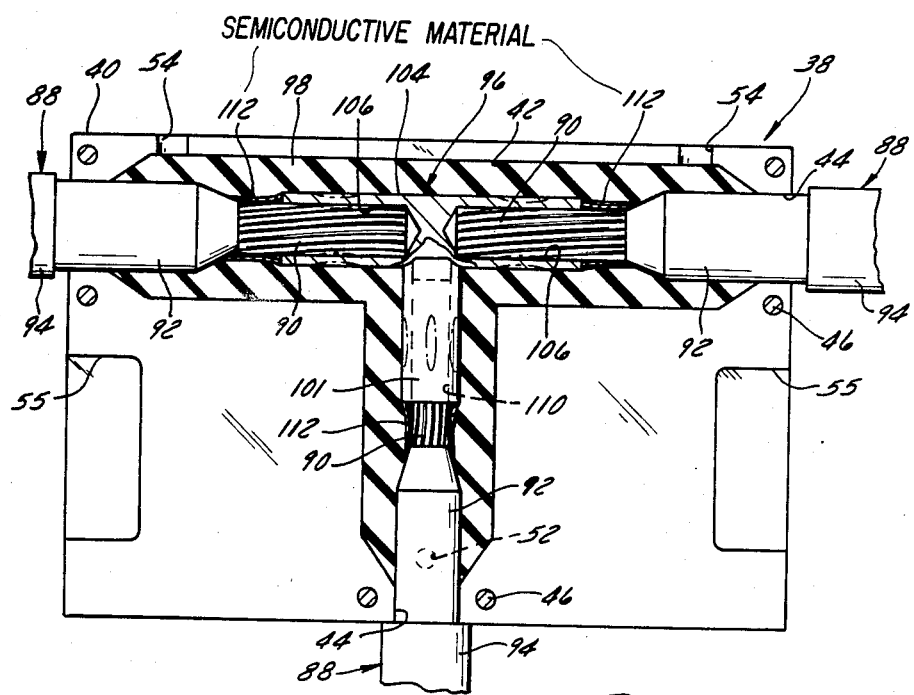
FIG. 6 is a view, partly in section, showing a T-connector supported in the cavity by insulated cables after the silicone rubber has cured.
Figure 7:
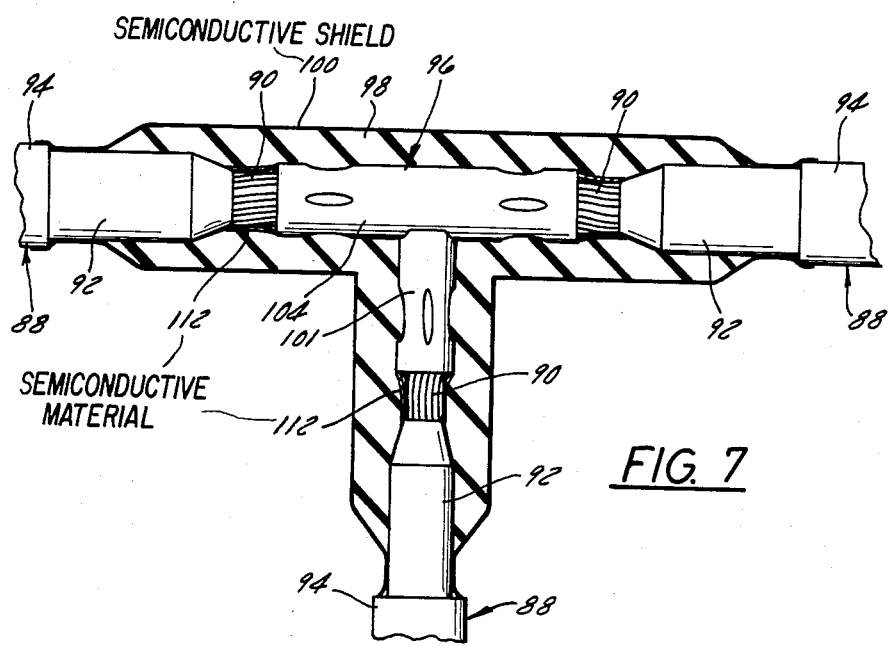
FIG. 7 is a cross-sectional view of the molded insulated T-connector for connecting insulated cables.

The insulated T-connector 16 can also be formed for use in connecting insulated cables 88 of the type having an electrical conductor 90, insulation 92 and a semi-conductive shield 94. Referring to FIGS. 6 and 7, the T-connector shown includes a conductive member 96, cables 88, a molded insulation 98 and a semi-conductive shield 100. The conductive member 96 generally includes a tubular member 101 secured to the center of a cross member 104. The cross member 104 includes a blind bore 106 at each end. The tubular member 101 includes a blind bore 110. The ends of the exposed portion of the conductors 90 are crimped in the blind bores 106 and 110 of the conductive member 96. The blind bores 106 and 110 should have a diameter to match the diameter of the exposed portion of the conductor 90.

Means are provided for reducing voltage stress at the junction between the conductors 90 and the conductive member 96. Such means is in the form of a semi-conductive material 112 formed around the exposed portion of the conductor 90 between the conductive member 96 and the cable insulation 92. The semi-conducting material 112 should overlap a portion of the insulation 92 as seen in FIG. 6.

The T-connector 16 used with the insulated cable 88 has a molded insulation 98 which is bonded to the conductive member 96 in the mold 38 as described above. However, the cables 88 are also partially enclosed in the insulation 98 to form a continuous insulation around the conductive member 96 and the conductor 90. In this regard and referring to FIG. 6, it should be noted that the conductive member 96 is supported in the cavity 42 by the cables 88. The semi-conductive shield 94 has been stripped from the cable 88 to expose the end of the insulation 92. The exposed insulation 92 is supported in the reduced diameter sections 44 to form a seal therewith when the mold is closed. The cavity 42 is filled with liquid silicone rubber and allowed to cure as described above. The mold is opened and the semi-conductive material 100 is formed on the outer surface of the insulation 98. The semi-conductive material 100 can be formed from semi-conductive tape wrapped around the insulation, semi-conductive paint or a heat shrinkable tube. The semi-conductive material should overlap the semi-conductive shield 94 on the cables 88.

Figure 8:
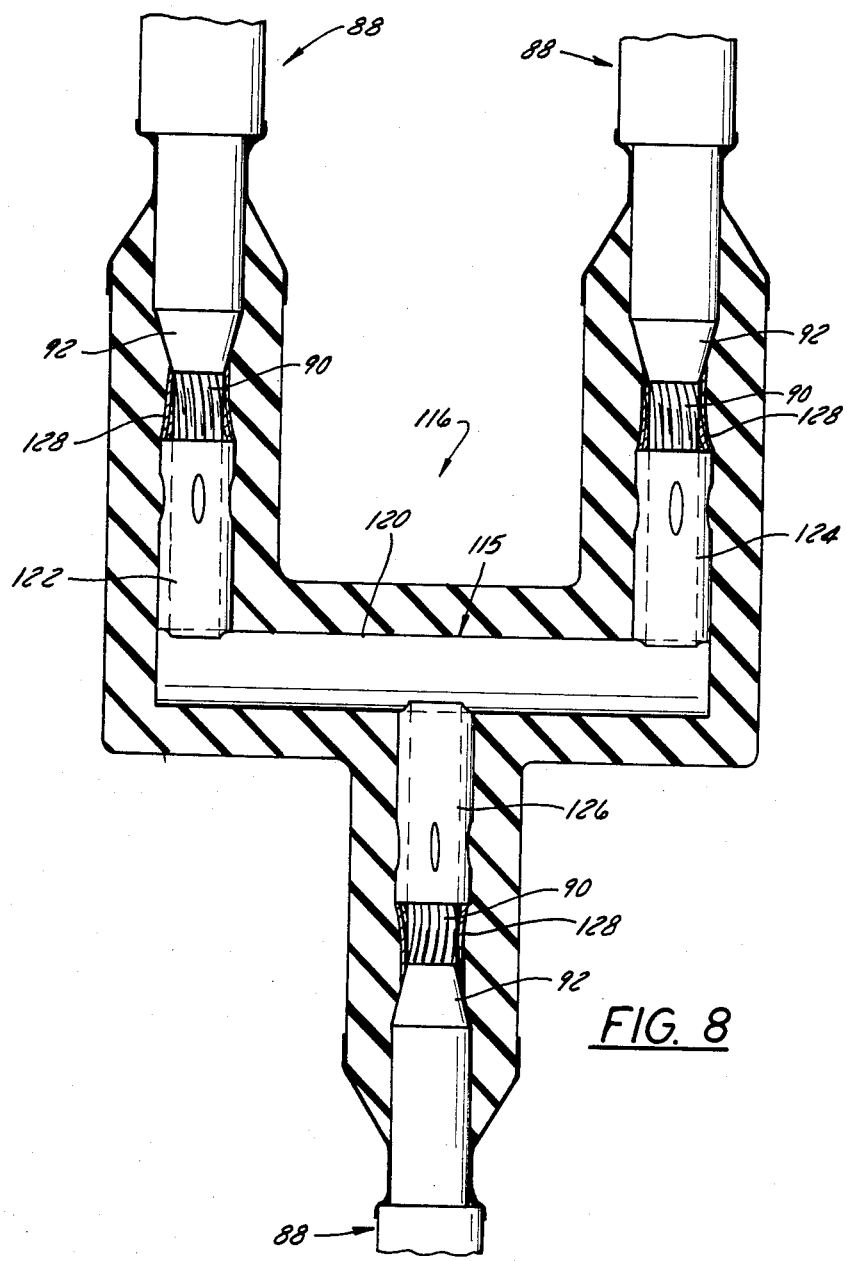
FIG. 8 is a section view of an alternate form of T-connector molded by the process of the present invention.

In the embodiment of the invention shown in FIG. 8, a Y-connector 116 is shown wherein all of the cables 88 are arranged in a generally parallel relation. The connector 116 includes a conductive member 115 formed from a cross bar 120 having tubular cable contacts 122 and 124 secured to the ends of the bar 120 in a parallel spaced relation and a single cable contact 126 secured to the center of the opposite side of the bar 120. The ends of the exposed portions of conductors 90 of cables 88 are crimped to the contacts 122, 124, 126 as described above. The conductive member 115 and cables 88 are prepared for molding by placing a conductive tape 128 about the exposed portion of the conductors 90 between the contacts 122, 124 and 126 and the cable insulation 92.

The embodiments of the invention in which an exclusive property or privilege is claimed, are defined as follows:

1. A process for manufacturing an insulated high voltage T-connector which comprises the steps of forming an electrically conductive member having a T-shape with openings at the three ends thereof for connection to insulated cables, stripping insulation from ends of insulated cables to expose the conductors of the cables, inserting into each of the openings in the conductive member an individual exposed conductor end, crimping the conductive member to the exposed ends of the conductors, aligning the conductive member and cables in a T-shaped cavity of an open split mold, the cavity extending beyond the exposed conductors to the adjacent insulation on each of the cables, the mold having reduced diameter sections at the outer ends of the T-shaped cavity to engage the insulation on each of the cables, closing the split mold so that the reduced diameter sections sealingly engage the insulation on each of the cables to support the conductive member in a spaced relation to the walls of the cavity in the mold, pouring a room temperature curable silicone rubber into the lower portion of the cavity so that the rubber rises slowly to the top of the cavity to encapsulate the conductuve member, the exposed conductors and the adjacent insulation on each cable, and allowing sufficient time for the silicone rubber to cure within the cavity, whereby the conductive member, the exposed conductors and the adjacent insulation on each cable are completely encapsulated in a solid silicone rubber insulation.

2. The process according to claim 1 including the step of heating the mold to cure the silicone rubber from the outside, inwardly toward the conductive member.

3. A method for manufacturing a T-connector comprising the steps of
    forming an electrically conductive 3-way connector having a T-shape with interlocking openings at the three ends of the connector,
    stripping the cable insulation from a number of high voltage cables to expose the cable conductors,
    securing an individual exposed conductor in each of the openings at the ends of the 3-way connector,
    positioning the 3-way connector in a split mold with the 3-way connector suspended by the cables in a spaced relation to the walls of the mold and with a portion of the insulation of each cable and the exposed conductors being within the mold,
    filling the mold with a liquid silicone rubber insulation to encapsulate the 3-way connector and portions of the insulation of the cables and the exposed conductors,
    allowing the silicone rubber insulation to vulcanize in the mold,
    removing the 3-way connector, cables and silicone rubber insulation from the mold,
    and covering the silicone rubber insulation with a semi-conductive shield.

4. The method according to claim 3 including the step of covering the exposed cable conductors with an electrically conductive material after the securing step.

5. The method according to claim 3 or 4 including the step of coating the 3-way connector with an adhesive primer prior to positioning the 3-way connector in the mold.

6. The method according to claim 3 or 4 including the step of heating the mold after filling to cure the silicone rubber insulation.

* * * * *